Figure 1:
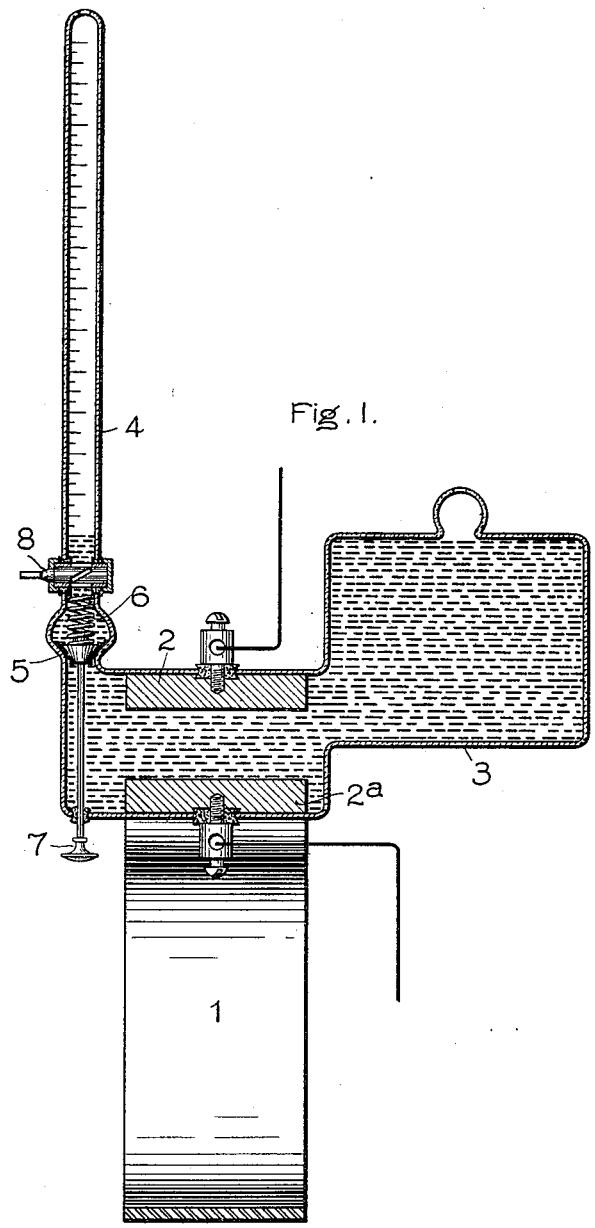

No. 663,461.  E. OXLEY.  Patented Dec. 11, 1900.
MAXIMUM DEMAND METER.
(Application filed July 31, 1899.)
(No Model.)

Witnesses.
Lewis Abell.
A. F. Macdonald.

Inventor.
Eustace Oxley
by Albert G. Davis
Atty.

UNITED STATES PATENT OFFICE.

EUSTACE OXLEY, OF LYNN, MASSACHUSETTS, ASSIGNOR TO THE GENERAL ELECTRIC COMPANY, OF NEW YORK.

MAXIMUM-DEMAND METER.

SPECIFICATION forming part of Letters Patent No. 663,461, dated December 11, 1900.

Application filed July 31, 1899. Serial No. 725,602. (No model.)

*To all whom it may concern:*

Be it known that I, EUSTACE OXLEY, a subject of the Queen of Great Britain, residing at Lynn, county of Essex, State of Massachusetts, have invented certain new and useful Improvements in Maximum-Demand Meters, (Case No. 1,094,) of which the following is a specification.

This invention relates to a device for indicating the maximum demand of a consumption-circuit containing translating devices—that is to say, the maximum number of such translating devices in use at one time or the maximum strength of current used at any time in the consumption-circuit.

In carrying out the invention I employ a fluid column the level of which is capable of being electrically disturbed under the influence of a current. I so arrange the connections that this disturbance is proportional to the strength of current influencing the column and provide means for trapping the fluid when raised under the influence of the current above a predetermined level, so as to leave a record of the maximum disturbance which has occurred during a given period of service and for retarding its change of level to afford a slow movement and add a time factor to the meter indication.

More specifically considered, my invention relates to an electrically-controlled device in which a conducting fluid or part of the same is within the influence of a magnetic field and provided with terminal electrodes in contact with the liquid within the field of force. On one side the liquid is in communication with a reservoir and on the other side with a tube. Under these conditions when the current is passed through the electrodes the mutual repulsive action of the electrostatic and magnetic fields created by the magnet and current, respectively, acts as a pump, causing the level of the liquid to be disturbed in the tube and raised in proportion to the strength of the current passing between the electrodes. The pumping action will continue until the repelling force determined by the electrostatic and electromagnetic fields is balanced by the hydrostatic pressure due to the difference in level between the liquid in the reservoir and that in the tube. I provide also means for leaving an indication of the maximum disturbance of level, which may be a trap or some other convenient device by which the return of the liquid in the tube when raised above a predetermined level is prevented. This may assume various forms; but that which I prefer is a valve which permits the rise of the liquid in the tube, but is seated when the current ceases or declines in strength, thus retaining or trapping the liquid within the tube. If at any later period a greater strength of current be employed in the circuit—that is to say, if a larger current be used in the consumption-circuit—the valve will be free to permit more liquid to be pumped into the tube and the level to be still further raised, and after the period of increased-current demand has elapsed the valve will again seat. It will be obvious, however, that many other methods might be devised and will occur to those skilled in the art for trapping the liquid displaced, so as to indicate the maximum quantity of liquid moved or maximum level to which it is raised. I prefer also to add to the device a time-indicating factor by which the level of the liquid may be disturbed only in a slow manner, thereby insuring that if the maximum demand occur for only a very brief interval the meter will not register.

My invention therefore comprises a meter of the kind referred to in which means are provided for transferring the fluid from one level to another proportionately to the strength of current in the consumption-circuit and means for indicating the maximum difference of such levels.

It comprises also other and more specific features which will hereinafter be more fully noted and will be specifically pointed out in the claims.

Figure 2:
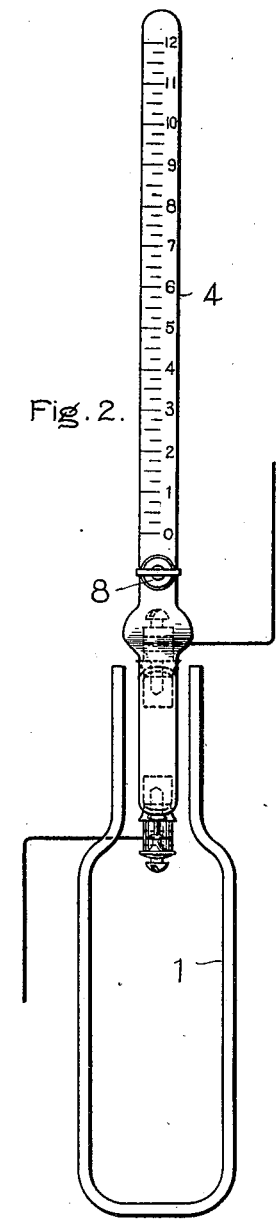

In the drawings illustrating my invention, Figure 1 is a sectional view of a device embodying my improvements. Fig. 2 is an elevation on a plane at right angles to that indicated in Fig. 1.

1 represents a magnet, which may be an electromagnet or a permanent magnet, the field of force of which is traversed by a conducting fluid. Within the field of force or in such relation thereto as to permit the transmission of an electric current across the same are two conducting-electrodes 2 2ª, which form terminals, to which may be connected the consumption-circuit. The electric and the magnetic fields should be symmetrically related with relation to their centers. Otherwise the desired pumping action will not occur. The electrodes are sealed fluid-tight where they pass through the walls inclosing the fluid. On one side of the magnetic field is an enlarged reservoir to contain the body of fluid, as indicated at 3, and on the other side is a vertical tube 4, graduated to indicate the relative displacement of the liquid under different strengths of current. Within the tube is a valve 5, which may be packed on the outside, or its seat may be packed with some soft material to form a fluid-tight joint when the valve is seated under the pressure of the displaced fluid, assisted by the tension of a light coil-spring 6. A stem connected to the valve passes through a suitable part of the containing vessel and is provided with a knob or handle 7, which permits the valve to be unseated and controls the return flow of the liquid when the meter is reset. I provide also in the tube a cock 8, provided with a narrow perforation, which may be turned to different angles, so as to permit a larger or smaller channel of communication between the tube and the reservoir in a manner similar to a gas-key, which will be readily understood.

As thus organized, when the device is put in series relation to the consumption devices in an electric circuit, stream lines of current traverse the liquid between the electrodes, and the chains of liquid-electrified molecules are repelled by the magnetic field in accordance with a well-known principle of physics and in a definite direction, depending on the direction of current. The strength of the repulsion is determined coördinately by the strength of the magnetic field and the strength of the current flowing across the liquid. The device will thus act after the fashion of a pump forcing the liquid from the reservoir into the tube until the hydrostatic pressure is sufficient to counterbalance the molecular repulsion by the magnetic field of force. The valve should be so organized that it will not offer material resistance to flow in one direction and will easily seat against a tendency to counterflow. Thus under the influence of the current liquid is pumped up into the tube 4 and when the translating devices are cut off cannot flow back. This action is slowly effected by reason of the small opening governed by the cock 8. Consequently if the period of excessive current admission be short the liquid will not have sufficient time to accumulate to raise it above a predetermined zero level. If continued for some time, however, it passes this level and leaves a record that more than the average demand has been made upon the translating devices. If at a subsequent period before the resetting of the meter a greater demand should be made upon the current, the level will be proportionately raised and the maximum amperage always indicated by the graduation corresponding to the level at which the liquid stands. In resetting the meter it is only necessary to push up the knob 7 and turn on the key to its full open position, when the two liquid columns on the two sides will assume a normal hydrostatic balance and the apparatus will be in condition for further use.

In order to permit a convenient and sensitive operation of the device, leak-holes for air should be provided in the tube and in the reservoir, as indicated, to permit a free movement of the conducting liquid under the influence of the current. I prefer to employ as a conducting liquid mercury, since it will carry a current without the liberation of gases. Any conducting liquid, however, or fluid would be within the scope of my invention.

What I claim as new, and desire to secure by Letters Patent of the United States, is—

1. A maximum-demand meter comprising a liquid, means for disturbing the hydrostatic balance proportionally to the strength of current in a consumption-circuit controlling said fluid, and an indicating device to make a continuing indication of the maximum difference of level.

2. A maximum-demand meter comprising a liquid, means for moving the same proportionately to the energy controlling it, an indicator for showing the extent of its movement, and means for preventing an indication of energy fluctuation of short duration.

3. A maximum-demand meter, comprising a liquid, means for transferring the same from one level to another proportionally to the strength of current in a consumption-circuit controlling said transfer, and a trap for the transferred liquid.

4. A maximum-demand meter comprising a liquid, electrically-controlled devices to disturb the hydrostatic balance of said liquid proportionally to the strength of current in a consumption-circuit governed by the meter, and a valve to prevent backflow of the liquid when raised above a predetermined level.

5. A maximum-demand meter comprising a conducting liquid communicating with a reservoir on one side and a tube on the other and traversing a magnetic field at a suitable point, electrodes within the field for inclusion in the consumption-circuit, whereby the liquid is displaced when conducting current, and a valve to prevent backflow of the liquid when raised above a predetermined height.

6. A maximum-demand meter comprising a conducting liquid communicating with a reservoir on one side and a tube on the other and traversing a magnetic field at a suitable point, electrodes within the field for communicating with a consumption-circuit, and a valve to prevent backflow of the liquid when raised above a predetermined height, said valve being provided with a hand-controlled restoring device to permit backflow of the liquid to reset the meter.

7. A maximum-demand meter comprising a conducting liquid communicating with a reservoir on one side and a tube on the other and traversing a magnetic field at a suitable point, electrodes within the field for connection with a consumption-circuit, a valve to prevent backflow of the liquid when raised above a predetermined height, and a small admission-orifice to the tube to provide a time factor for the meter indication.

8. A maximum-demand meter comprising a conducting liquid communicating with a reservoir on one side and a tube on the other and traversing a magnetic field at a suitable point, electrodes within the field for connection with a consumption-circuit, a valve to prevent backflow of the liquid when raised above a predetermined height, and an adjustable opening controlling the admission of fluid to the tube to vary the time element of the meter indication.

In witness whereof I have hereunto set my hand this 27th day of July, 1899.

EUSTACE OXLEY.

Witnesses:
DUGALD MCKILLOP,
JOHN MCMANUS.